US012777330B1

(12) United States Patent
Magnússon

(10) Patent No.: US 12,777,330 B1
(45) Date of Patent: Oct. 27, 2026

(54) TRACKING LABEL ACTIVATION AND VERIFICATION SYSTEM

(71) Applicant: Samsara Inc., San Francisco, CA (US)

(72) Inventor: Hannes Magnússon, Danville, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/557,561

(22) Filed: Mar. 5, 2026

(51) Int. Cl.
*H04W 12/06* (2021.01)
*H04L 9/08* (2006.01)
*H04L 9/30* (2006.01)
*H04L 9/32* (2006.01)

(52) U.S. Cl.
CPC ........... *H04W 12/06* (2013.01); *H04L 9/0825* (2013.01); *H04L 9/30* (2013.01); *H04L 9/3247* (2013.01)

(58) Field of Classification Search
CPC ........ H04W 12/06; H04L 9/0825; H04L 9/30; H04L 9/3247
USPC ........................................... 455/411; 370/338
See application file for complete search history.

(56) References Cited

U.S. PATENT DOCUMENTS 7,072,697 B2 * 7/2006 Lappetelainen .. H04W 52/0229 455/574
8,737,965 B2 * 5/2014 McCown ............ H04W 12/122 455/410
11,128,661 B2 * 9/2021 Li ......................... H04W 12/71
2023/0412286 A1 * 12/2023 Takahashi .............. H04B 17/17
2025/0264878 A1 * 8/2025 Dean ........................ A61G 5/04

* cited by examiner

*Primary Examiner* — Marcos Batista
(74) *Attorney, Agent, or Firm* — Schwegman Lundberg & Woessner, P.A.

(57) ABSTRACT

A method for activating and verifying a tracking device using a computing device having a first radio and a second radio. The computing device transmits a first wireless signal via the first radio to the tracking device, causing the tracking device to transition from a dormant state to an active state. The computing device receives first identification data from the tracking device via the first radio responsive to the first wireless signal, and receives second identification data wirelessly transmitted by the tracking device via the second radio. The computing device compares the first identification data and the second identification data and causes display of a verification indication based on the comparing. The computing device transmits the first and second identification data to a server, which verifies a cryptographic signature contained in the first identification data and returns an authenticity indication.

20 Claims, 8 Drawing Sheets

TRACKING LABEL ACTIVATION AND VERIFICATION SYSTEM

TECHNICAL FIELD

Embodiments of the present disclosure relates to wireless device activation and verification systems, and more particularly to methods and systems for activating and verifying Internet of Things (IoT) tracking devices.

BACKGROUND

Wireless tracking devices are used in logistics and supply chain applications to monitor the location and status of shipments during transit. These devices typically incorporate one or more wireless communication technologies, such as Bluetooth Low Energy (BLE), to transmit location data to receiving gateways or other infrastructure.

Many tracking devices are shipped in a dormant state to preserve battery life during storage and distribution. Before use, these devices must be activated so that they begin transmitting wireless signals. Activation typically requires specialized equipment, including dedicated printers with integrated wireless readers, external antenna dongles, and computing devices running proprietary software. These systems often require network connectivity to external databases during the activation process to retrieve device configuration data and verify device identity.

Such activation workflows present challenges in field environments where specialized equipment may not be available or practical to deploy. Warehouse workers, dock personnel, and freight handlers may lack access to the necessary hardware and software infrastructure. The complexity of existing activation systems can result in delays, errors, and failed activations, particularly when devices are defective or misconfigured.

Additionally, tracking devices that contain multiple independent wireless components present verification challenges. When a device includes separate chips for different wireless protocols, confirming that all components are functioning correctly and correspond to the same physical device requires coordination between the components or reliance on external data sources.

There remains a need for simplified approaches to activating and verifying wireless tracking devices in field environments using commonly available equipment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
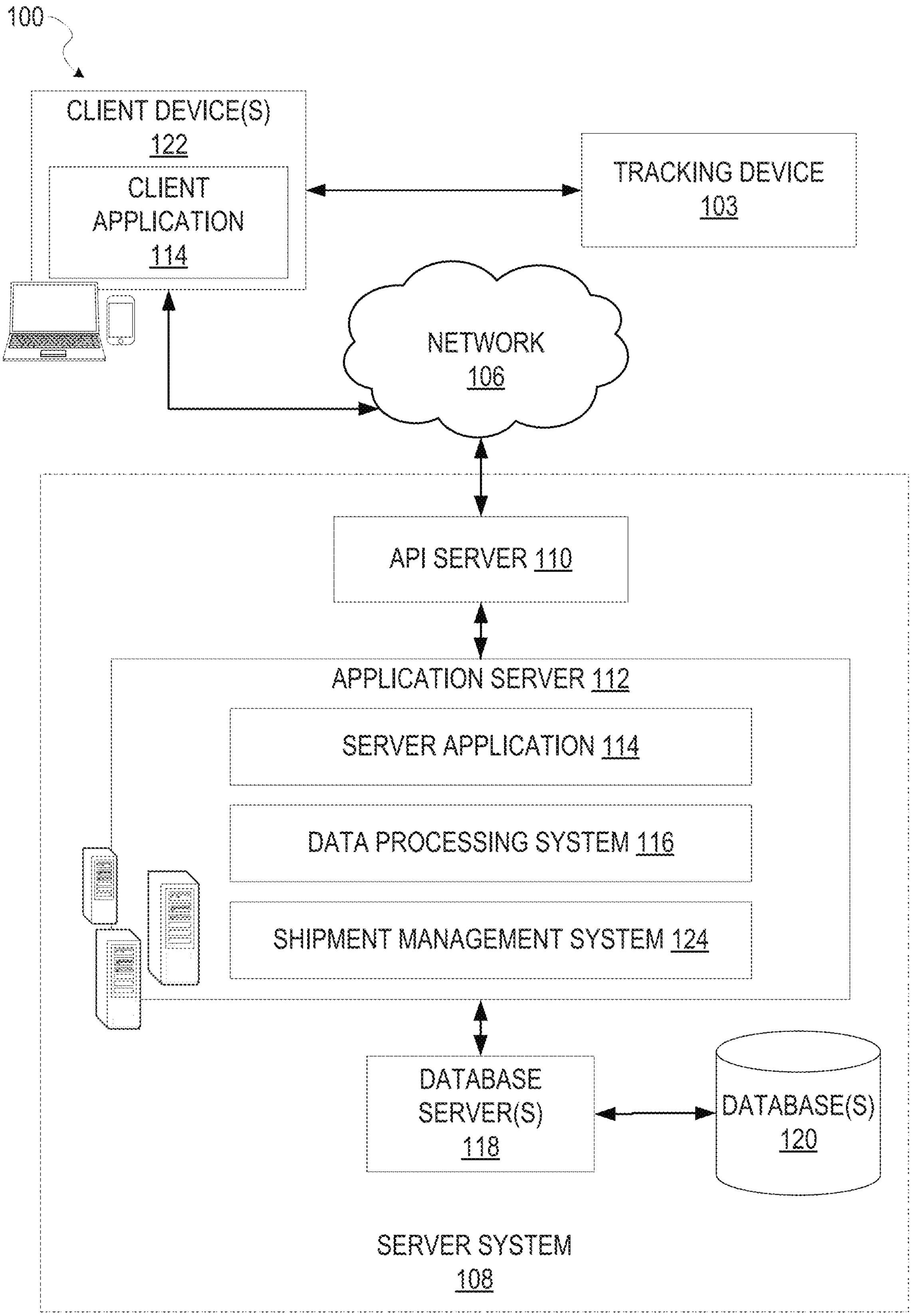
FIG. 1 is a block diagram illustrating a system architecture including client devices, vehicle gateways, system gateways, and server components connected via a network according to certain examples.

The present disclosure relates to methods, systems, and computer-readable media for activating and verifying tracking devices using a computing device equipped with multiple wireless radios.

Tracking devices are used in logistics and supply chain environments to monitor the location and status of shipments. Certain tracking devices incorporate two independent wireless components, for example, a near-field communication (NFC) chip and a Bluetooth Low Energy (BLE) chip, on a shared substrate. The two chips may be electrically and logically independent and do not communicate with each other directly. The tracking device may be manufactured in a dormant state in which the BLE chip is unpowered to preserve battery life during storage and distribution.

Activating such a tracking device requires powering on the BLE chip so that it begins emitting wireless advertisements detectable by an observation network. However, powering on the BLE chip alone is insufficient. Because the two chips on the tracking device cannot self-verify against each other, an external process is needed to confirm that the BLE chip actually powered on, that it is functioning correctly, and that it corresponds to the same physical device whose NFC chip was read.

Existing approaches to activating and verifying such tracking devices involve specialized hardware setups. For example, one known workflow requires a dedicated NFC-enabled label printer, a Bluetooth reader dongle mounted near the printer's label feed, and a laptop running specialized software connected to both the printer and a cloud database. The software directs the printer to activate each label via NFC, after which the Bluetooth dongle verifies that the BLE chip powered on correctly. Before activation, the software queries the cloud database to retrieve a pre-registered mapping between the NFC chip's serial number and the BLE chip's address, wherein the mapping may be established during manufacturing and stored externally. Without network connectivity to perform this lookup, the system cannot verify that the correct BLE chip activated.

This approach requires specialized hardware, a fixed workstation, network connectivity for cloud database lookups, and trained operators. It is impractical for field use in logistics environments where dock workers, freight handlers, and drivers need to activate tracking devices at the point of shipment. These workers cannot carry a printer, dongle, and laptop to activate labels on a loading dock.

Additionally, tracking devices in label form can be counterfeited, cloned, or placed on incorrect packages. Barcode-based and QR-code-based labels are trivially duplicated. NFC-based labels can also be cloned if verification relies solely on reading the tag's static data. Without a mechanism to verify that a label is genuine and has not been tampered with, the integrity of the tracking system is compromised.

There is also no way to determine whether a tracking device was manufactured correctly or has been damaged during storage, shipping, or handling until someone activates it and confirms the BLE chip powers on and functions as expected. Defective labels that fail silently result in shipments that are never tracked.

The present disclosure describes a method for activating and verifying a tracking device using a computing device equipped with a first radio and a second radio. The computing device transmits a first wireless signal to the tracking device via the first radio. In response to the first wireless signal, the computing device receives first identification data from the tracking device via the first radio. The tracking device transitions from a dormant state to an active state in response to the first wireless signal, and the computing device receives second identification data wirelessly transmitted by the tracking device via the second radio. The computing device compares the first identification data and the second identification data and displays a verification indication on a display based on the comparison.

In some examples, the first identification data comprises an identifier of the tracking device, and the comparing comprises matching the identifier against an address contained in the second identification data. The identifier may correspond to a portion of a media access control (MAC) address that the tracking device advertises via the second radio after transitioning to the active state. The computing device performs this matching locally without querying an external database or cloud service, because the tracking device carries its own verification data in the first identification data.

In some examples, the computing device measures a signal strength of the second identification data received via the second radio. The verification indication is further based on the signal strength exceeding a threshold. Because the first radio operates at close range—requiring the computing device to be within approximately four centimeters of the tracking device—the signal strength of the second identification data at the time of receipt provides an indication of physical proximity between the computing device and the tracking device. A signal strength below the threshold may indicate that the computing device is receiving a transmission from a distant or unrelated device rather than from the tracking device that was just activated.

In some examples, the first radio operates according to a near-field communication protocol and the second radio operates according to a Bluetooth protocol. The first wireless signal transmitted via the first radio provides energy that the tracking device harvests to power on its Bluetooth chip from the dormant state. A single physical action by a user (i.e., holding the computing device against the tracking device) simultaneously provides the activation energy and causes the computing device to read the first identification data.

In some examples, the computing device transmits the first identification data and the second identification data to a server. The server verifies a cryptographic signature contained in the first identification data and returns an authenticity indication to the computing device. The cryptographic signature is an asymmetric digital signature over a serial number of the tracking device, signed during manufacturing using a private key that does not leave the manufacturing facility. The server holds only public keys for verification. In certain examples, the server selects the public key from a plurality of public keys based on a key version identifier contained in the first identification data, enabling key rotation without invalidating tracking devices already in the field.

In some examples, the first identification data is received as a uniform resource identifier containing a plurality of parameters. The plurality of parameters comprises an identifier of the tracking device, a serial number, and a cryptographic signature. The uniform resource identifier may also contain a hardware version, a firmware version, and a signature key version. The computing device parses the uniform resource identifier to extract these parameters for use in the comparing step and for transmission to the server.

In some examples, the verification indication comprises a success indication displayed in response to the first identification data matching the second identification data, and a failure indication displayed in response to the first identification data not matching the second identification data within a timeout period. The timeout period allows time for the tracking device to begin transmitting after transitioning from the dormant state to the active state. If no matching transmission is received within the timeout period, the tracking device may be defective, may not have powered on correctly, or the first and second identification data may correspond to different devices.

In some examples, in response to the verification indication indicating a successful match, the computing device transmits shipment data associated with the tracking device to a server without transmitting a user authentication credential. The first identification data and the second identification data, including the cryptographic signature and the address, serve as proof that the computing device had physical custody of a genuine tracking device. The server attributes the shipment data to an organization associated with the tracking device based on a device registry lookup, without requiring the user of the computing device to authenticate with a username, password, API token, or other credential.

FIG. 1 is a block diagram showing an example system 100 for tracking label activation and verification, according to certain examples. The system 100 includes a tracking device 103, client device(s) 122 hosting a client application 114, and a server system 108. The client device(s) 122 communicate with the tracking device 103 via direct local wireless communication and communicate with the server system 108 via a network 106.

The tracking device 103 may include a tracking label comprising a plurality (e.g., two) independent wireless components on a shared substrate. The tracking device 103 includes a near-field communication (NFC) chip and a Bluetooth Low Energy (BLE) chip. In certain examples the NFC chip and the BLE chip are electrically and logically independent and do not communicate with each other directly. The tracking device 103 also includes one or more batteries that provide power to the BLE chip after activation. The tracking device 103 is manufactured in a dormant state in which the BLE chip is unpowered. The NFC chip is passive and does not draw power from the batteries. The NFC chip stores an NFC Data Exchange Format (NDEF) record containing a uniform resource identifier (URI) with a plurality of parameters including a BLE identifier corresponding to a portion of a media access control (MAC) address of the BLE chip, a serial number, a cryptographic signature, and a signature key version. These parameters are programmed into the NFC chip during manufacturing. The BLE identifier is embedded directly in the URI so that the client device(s) 122 can verify the BLE chip without querying any external database or registry.

The client device(s) 122 is a mobile device such as a smartphone or tablet. The client device(s) 122 includes a first radio operating according to a near-field communication protocol, a second radio operating according to a Bluetooth protocol, a display, one or more processors, and a camera. The client device(s) 122 hosts the client application 114. The client application 114 may be a full application installed on the client device(s) 122 or an application clip that launches without prior installation in response to the client device(s) 122 reading the URI from the NFC chip of the tracking device 103. An application clip is a lightweight application component that is downloaded and launched in response to the client device(s) 122 encountering a registered URL, without requiring the user to visit an application store or confirm an installation. The application clip may perform the same activation and verification operations as the full application. After verification, the application clip may store verified data in shared storage accessible by the full application, so that a user who subsequently opens the full application can continue the shipment submission workflow without re-scanning the tracking device 103.

The client application 114 controls the first radio and the second radio to perform the activation and verification operations described herein. The client device(s) 122 is in direct local wireless communication with the tracking device 103 via the first radio and the second radio, without the network 106 as an intermediary for that local communication. In addition to performing activation and verification, the client device(s) 122 may also operate as a mobile gateway. When operating as a mobile gateway, the client application 114 uses the second radio to passively receive BLE advertisements from one or more tracking devices 103 in the vicinity of the client device(s) 122, without requiring the user to initiate a scan or tap the tracking device 103. The client application 114 captures observation data from the received BLE advertisements, including the MAC address, RSSI, and a timestamp, and pairs the observation data with geographic coordinates obtained from a location sensor of the client device(s) 122. The client application 114 transmits the observation data and the geographic coordinates to the server system 108 via the network 106. The server system 108 processes these observations in the same manner as observations received from fixed or vehicle-mounted gateways, using them to update the location estimates and status transitions of shipments associated with the observed tracking devices 103. This allows the client device(s) 122 carried by a worker in a warehouse, loading dock, or other facility to provide location observations for tracking devices 103 in the worker's vicinity, even when no fixed or vehicle-mounted gateway is present.

In some examples, to activate the tracking device 103, a user holds the client device(s) 122 against the tracking device 103. The first radio of the client device(s) 122 transmits a first wireless signal that emits an electromagnetic field. The NFC chip of the tracking device 103 harvests energy from this electromagnetic field. An energy harvesting circuit on the tracking device 103 connects the NFC chip to a power switch of the BLE chip, such that when sufficient energy is harvested, the BLE chip transitions from the dormant state to an active state and begins emitting BLE advertisements using power from the one or more batteries. Simultaneously, the first radio reads the NDEF record from the NFC chip, and the client application 114 parses the URI to extract the BLE identifier, serial number, cryptographic signature, and signature key version.

After reading the NFC chip, the client application 114 switches the second radio to active scanning mode. The BLE chip of the tracking device 103, now in the active state, emits BLE advertisements containing manufacturer data, a protocol version, a product identifier, and a MAC address. For each BLE advertisement received by the second radio, the client application 114 checks whether the advertisement contains data identifying it as originating from the tracking device 103 and whether a portion of the MAC address in the BLE advertisement matches the BLE identifier extracted from the NFC chip. In one example, the client application 114 compares the last four bytes of the MAC address in the BLE advertisement against the BLE identifier read from the NFC chip. This cross-check confirms that the BLE chip that powered on is the same device whose identity was read from the NFC chip. Because the NFC chip and BLE chip do not communicate with each other, the client device(s) 122 acts as a bridge that interacts with both chips and confirms they belong to the same physical tracking device 103.

The client application 114 also measures a received signal strength indicator (RSSI) of the BLE advertisement received by the second radio. Because the user held the client device(s) 122 against the tracking device 103 during the NFC tap at a distance of approximately four centimeters, the client device(s) 122 is in close physical proximity to the BLE chip when it first begins transmitting. The client application 114 compares the measured RSSI against a configurable threshold. An RSSI value above the threshold confirms that the client device(s) 122 is near the tracking device 103 rather than receiving a signal from a distant or unrelated device. The RSSI value measured at the moment of activation, when the distance between the client device(s) 122 and the tracking device 103 is known, may serve as a baseline for calibrating subsequent distance estimates for that tracking device 103 and client device(s) 122 combination.

Based on the comparison, the client application 114 causes display of a verification indication on the display of the client device(s) 122. If the BLE identifier from the NFC chip matches the MAC address portion from the BLE advertisement and the RSSI exceeds the threshold, the display presents a success indication. If no matching BLE advertisement is received within a timeout period, the display presents a failure indication. In one example, the timeout period is twenty-five seconds. A failure may indicate that the BLE chip did not power on, the tracking device 103 is defective, or the NFC chip and BLE chip are mismatched. The user may be prompted to retry or scan a different tracking device 103.

The network 106 facilitates communication between the client device(s) 122 and the server system 108. The network 106 supports transmission of activation data, shipment data, and location observation data between the client device(s) 122 and the server system 108. The network 106 may include one or more of the Internet, a cellular network, a wireless local area network, or other communication networks.

The server system 108 includes an API server 110, an application server 112, database server(s) 118, and database(s) 120. The API server 110 receives data submissions from the client application 114 on the client device(s) 122. The data submissions include the first identification data read from the NFC chip and the second identification data captured from the BLE advertisement of the BLE chip. The client device(s) 122 transmits the full NFC payload and the raw BLE advertisement packet to the API server 110, rather than only parsed fields, so that the server system 108 can independently re-verify the data without relying on the client application 114 to have performed the verification correctly.

The application server 112 hosts a server application 114, a data processing system 116, and a shipment management system 124. The server application 114 performs backend verification of the tracking device 103. The server application 114 verifies the cryptographic signature contained in the first identification data by selecting a public key from a plurality of public keys stored in the database(s) 120 based on the signature key version extracted from the NFC URI. The plurality of public keys are organized by version, enabling key rotation without invalidating tracking devices 103 already in the field. The corresponding private keys are used during manufacturing to sign each tracking device's serial number and are not stored on the server system 108. The server application 114 also cross-checks the BLE identifier from the NFC URI against the MAC address in the raw BLE advertisement packet submitted by the client device(s) 122, independently confirming the same match that the client device(s) 122 performed locally.

The server application 114 also implements an authentication path in which the first identification data and the second identification data serve as proof of physical custody of the tracking device 103, without requiring the user of the client device(s) 122 to provide a user authentication credential such as a username, password, API token, or OAuth token. If the cryptographic signature is valid, the NFC and BLE data are consistent, and the RSSI and timestamps are plausible, the server application 114 accepts the submission and attributes it to an organization associated with the tracking device 103 based on a device registry stored in the database(s) 120 that maps device MAC addresses to organizations. This allows a user to activate a tracking device 103 and submit shipment data without creating an account or logging in. A user processing shipments for multiple organizations in a single session activates each tracking device 103 individually, and the server application 114 attributes each submission to the correct organization based on the device registry, without requiring the user to switch accounts or scan separate credentials for each organization. In some examples, the API server 110 also supports an alternative authentication path using a bearer token distributed via a QR code, for backward compatibility with existing workflows.

The data processing system 116 processes location observation data to track the tracking device 103 throughout a shipment lifecycle. In some examples, one or more gateways deployed in vehicles or at fixed locations receive BLE advertisements from the tracking device 103 after activation and report observation data (including the MAC address, signal strength, and the gateway's own coordinates) to the server system 108 via the network 106. The data processing system 116 aggregates these observations to produce location estimates for each tracking device 103 over time. The data processing system 116 calculates the distance between the observed coordinates of the tracking device 103 and the origin and destination coordinates of the associated shipment record using a great-circle distance calculation. If the distance is within a proximity threshold, the tracking device 103 is considered to be at that location. In one example, the proximity threshold is one mile. In some examples, the data processing system 116 generates shaped geofences based on origin and destination addresses by looking up property boundaries or building footprints associated with those addresses, rather than relying on a fixed-radius proximity check.

The shipment management system 124 manages the lifecycle of shipment records associated with tracking devices 103. Each tracking device 103 is bound to exactly one shipment record in a one-to-one relationship. A tracking device 103 is not reassigned to a different shipment. The shipment management system 124 manages automatic status transitions for the shipment based on proximity calculations performed by the observation module 208 and the lifecycle module 204, transitioning the shipment through a sequence of states: CREATED, AT_ORIGIN, IN_TRANSIT, AT_DESTINATION, DELIVERED, and ARCHIVED. The CREATED state is the initial state when the tracking device 103 is activated and a shipment record is created. The AT_ORIGIN state indicates that the tracking device 103 has been detected within the proximity threshold of the origin coordinates. The IN_TRANSIT state indicates that the tracking device 103 has left the origin proximity zone. The AT_DESTINATION state indicates that the tracking device 103 has been detected within the proximity threshold of the destination coordinates. The DELIVERED state indicates that the shipment has been confirmed as delivered. The ARCHIVED state indicates that the shipment is complete and no longer actively tracked. The shipment management system 124 performs automatic delivery detection when the tracking device 103 has been at the destination for a configurable period without manual delivery confirmation. In one example, the configurable period is three days. The shipment management system 124 also performs automatic archival of delivered shipments after a configurable post-delivery period. In one example, the configurable post-delivery period is seven days.

If the tracking device 103 is activated while already away from the origin coordinates, the shipment management system 124 skips the AT_ORIGIN state and transitions the shipment directly to IN_TRANSIT. A recipient may also confirm delivery by tapping the tracking device 103 with a mobile device, and the client application 114 distinguishes between an activation scan of a new tracking device 103 and a delivery scan of an already-activated tracking device 103.

The shipment management system 124 may also implement privacy-preserving location history filtering. When generating location history for a shipment, if origin coordinates exist and a first location observation is within a configurable time window of an origin entry timestamp, the shipment management system 124 suppresses location history from before the origin entry time. This prevents exposure of pre-shipment device movements that may reflect the movements of a person carrying the tracking device 103 rather than the shipment itself. In one example, the configurable time window is two days. If the first observation is outside the configurable time window, the shipment management system 124 retains the full location history. Post-delivery location data is also suppressed to prevent tracking of the tracking device 103 after the shipment is complete, such as when the package is forwarded to an end consumer or when the tracking device 103 is discarded.

The shipment management system 124 further includes an extraction function that receives an image of a shipping document captured by the camera of the client device(s) 122 and uploaded via the API server 110. The shipment management system 124 sends the image to a vision-capable model that returns structured data including shipment identifiers, origin and destination addresses, shipper and consignee names, and a confidence score. The extracted data auto-populates the shipment record associated with the tracking device 103, and the origin and destination addresses are geocoded to obtain coordinates used for the proximity-based status transitions described above.

Database server(s) 118 manage storage and retrieval of data in the database(s) 120. The database(s) 120 store shipment records, device registration data including the device registry mapping device MAC addresses to organizations, location observation history, public keys for signature verification organized by version, and extracted shipment metadata. The database(s) 120 also store associated timestamps, device identifiers, and geographic coordinates.

In operation, the client device(s) 122 activates and verifies the tracking device 103 via direct local wireless communication using the first radio and the second radio. The client device(s) 122 transmits the activation data and any shipment data (including images of shipping documents) to the server system 108 via the network 106. The server system 108 independently verifies the cryptographic signature and the NFC-to-BLE data consistency, creates a shipment record bound to the tracking device 103, extracts shipment metadata from any submitted images, and tracks the shipment lifecycle from activation through delivery and archival using location observations from gateways reporting via the network 106.

Figure 2:
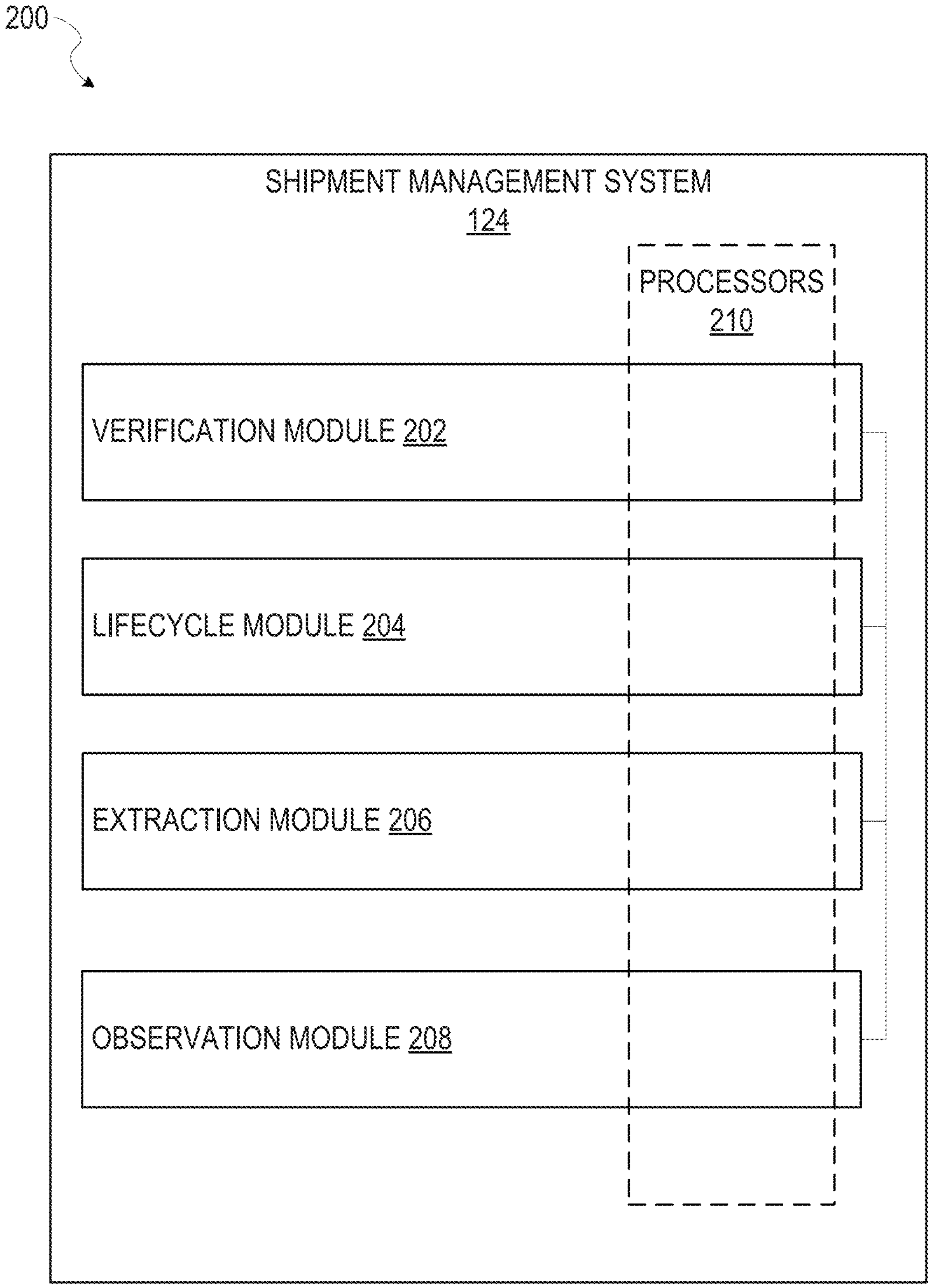
FIG. 2 is a block diagram showing internal components of a data processing system including data collection, analysis, processing, and alert generation modules according to certain examples.

FIG. 2 is a block diagram illustrating the shipment management system 124 of FIG. 1, according to certain examples. The shipment management system 124 includes a verification module 202, a lifecycle module 204, an extraction module 206, an observation module 208, and one or more processors 210. The processors 210 execute the operations of the verification module 202, the lifecycle module 204, the extraction module 206, and the observation module 208. Each of the modules 202, 204, 206, and 208 may be implemented as software instructions stored in the database(s) 120 or in memory local to the application server 112 and executed by the processors 210, as hardware logic, or as a combination of software and hardware.

The verification module 202 receives first identification data and second identification data submitted by the client device(s) 122 via the API server 110. The first identification data is data read from an NFC chip of a tracking device 103 by the client device(s) 122 during the activation flow described with respect to FIG. 3. The first identification data includes a serial number, a BLE identifier, a cryptographic signature, and a signature key version. The first identification data is formatted as a uniform resource identifier containing the serial number, the BLE identifier, the cryptographic signature, and the signature key version as parameters. The second identification data is data captured from a BLE advertisement emitted by a BLE chip of the tracking device 103 by the client device(s) 122 during the activation flow described with respect to FIG. 3.

In some examples, the second identification data includes a MAC address, an RSSI value, a TX power value, and a raw advertisement packet. The verification module 202 selects a public key from a plurality of public keys stored in the database(s) 120 based on the signature key version contained in the first identification data. The plurality of public keys may be organized in a versioned registry that allows migration to different cryptographic schemes without invalidating tracking devices 103 already in the field. The verification module 202 verifies the cryptographic signature contained in the first identification data against the serial number using the selected public key. The verification module 202 cross-checks the BLE identifier from the first identification data against the MAC address contained in the second identification data. In one example, the BLE identifier comprises the last four bytes of the MAC address of the BLE chip, and the cross-check comprises matching the BLE identifier against the corresponding bytes of the MAC address extracted from the raw advertisement packet. The verification module 202 evaluates the RSSI value contained in the second identification data against a proximity threshold to confirm that the client device(s) 122 was in close physical proximity to the tracking device 103 at the time of activation. The verification module 202 evaluates timestamps associated with the first identification data and the second identification data to confirm that the data is recent. If the cryptographic signature is valid, the BLE identifier matches the MAC address, the RSSI value exceeds the proximity threshold, and the timestamps are within an acceptable range, the verification module 202 outputs an authenticity indication to the client device(s) 122 via the API server 110 and accepts the submission. If any of these checks fail, the verification module 202 flags the tracking device 103 as potentially counterfeit, tampered, or malfunctioning. The verification module 202 attributes the accepted submission to an organization by looking up the MAC address in a device registry stored in the database(s) 120. The device registry maps MAC addresses of tracking devices 103 to organizations. The verification module 202 accepts the submission without requiring the client device(s) 122 to provide a user authentication credential. The first identification data and the second identification data, read from and captured in proximity to the tracking device 103, serve as proof of physical custody in lieu of a user authentication credential.

The lifecycle module 204 manages shipment records and automatic status transitions for shipments associated with tracking devices 103. When the verification module 202 accepts a submission for a tracking device 103, the lifecycle module 204 creates a shipment record in the database(s) 120 and binds the shipment record to that tracking device 103 in a one-to-one relationship. A tracking device 103 is not reassigned to a different shipment record. The lifecycle module 204 maintains a state value for each shipment record. The state value transitions through a sequence of states: CREATED, AT_ORIGIN, IN_TRANSIT, AT_DESTINATION, DELIVERED, and ARCHIVED. The CREATED state is the initial state value assigned when the shipment record is created.

To determine status transitions, the lifecycle module 204 receives location estimates for the tracking device 103 from the observation module 208. For each location estimate, the lifecycle module 204 calculates a great-circle distance between the observed coordinates of the tracking device 103 and the origin coordinates stored in the shipment record, and a great-circle distance between the observed coordinates and the destination coordinates stored in the shipment record. The origin coordinates and the destination coordinates are stored in the shipment record by the extraction module 206 after geocoding addresses extracted from a shipping document image, or are received from the client device(s) 122 via the API server 110 after manual entry by a user through the client application 114.

The lifecycle module 204 compares each calculated distance against a proximity threshold. In one example, the proximity threshold is one mile. The lifecycle module 204 applies the following transition rules based on the current state value and the proximity comparison. If the current state value is CREATED and the observed coordinates are within the proximity threshold of the origin coordinates, the lifecycle module 204 transitions the state value to AT_ORIGIN and records an origin entry timestamp in the shipment record. If the current state value is CREATED and the observed coordinates are not within the proximity threshold of the origin coordinates, the lifecycle module 204 transitions the state value to IN_TRANSIT, skipping the AT_ORIGIN state. This accounts for a scenario in which the tracking device 103 is activated after the shipment has already departed the origin. If the current state value is AT_ORIGIN and the observed coordinates are outside the proximity threshold of the origin coordinates, the lifecycle module 204 transitions the state value to IN_TRANSIT and records an origin departure timestamp in the shipment record. If the current state value is IN_TRANSIT and the observed coordinates are within the proximity threshold of the destination coordinates, the lifecycle module 204 transitions the state value to AT_DESTINATION and records a destination entry timestamp in the shipment record. If the current state value is AT_DESTINATION and the observed coordinates move outside the proximity threshold of the destination coordinates without a delivery confirmation, the lifecycle module 204 records a destination departure timestamp in the shipment record.

The lifecycle module 204 performs automatic delivery detection. If the tracking device 103 has remained within the proximity threshold of the destination coordinates for a configurable delivery period without receiving a manual delivery confirmation, the lifecycle module 204 transitions the state value from AT_DESTINATION to DELIVERED and records a delivery timestamp. In one example, the configurable delivery period is three days. In some examples, a recipient confirms delivery by tapping the tracking device 103 with a mobile device. The client application 114 on the mobile device reads the NFC chip of the tracking device 103 and determines that the tracking device 103 is already associated with an existing shipment record. The client application 114 transmits a delivery confirmation to the server system 108 via the API server 110, and the lifecycle module 204 transitions the state value to DELIVERED in response to the delivery confirmation.

The lifecycle module 204 performs automatic archival. After the state value has been DELIVERED for a configurable post-delivery period, the lifecycle module 204 transitions the state value to ARCHIVED. In one example, the configurable post-delivery period is seven days. In the ARCHIVED state, the shipment record is retained in the database(s) 120 for historical reference but is removed from active shipment views presented to users via the client application 114.

The lifecycle module 204 implements privacy-preserving location history filtering when generating location history for a shipment record. If origin coordinates exist in the shipment record and a first location observation for the tracking device 103 recorded by the observation module 208 is within a configurable time window of the origin entry timestamp, the lifecycle module 204 suppresses location data recorded before the origin entry timestamp. This prevents exposure of location data from before the shipment began, which may reflect movements of a person carrying the tracking device 103 prior to attaching it to a shipment. In one example, the configurable time window is two days. If the first location observation falls outside the configurable time window relative to the origin entry timestamp, the lifecycle module 204 retains the full location history. The lifecycle module 204 also suppresses location data recorded after the state value transitions to DELIVERED.

The extraction module 206 receives images of shipping documents uploaded by the client device(s) 122 via the API server 110. The images are captured by a camera of the client device(s) 122 during a shipment submission workflow. The extraction module 206 sends each received image to a vision-capable model. The vision-capable model analyzes the image and returns structured data including one or more shipment identifiers, origin and destination addresses, shipper and consignee names, and a confidence score indicating extraction quality. The extraction module 206 populates the shipment record associated with the tracking device 103 with the extracted structured data. The extraction module 206 geocodes the extracted origin and destination addresses to obtain geographic coordinates and stores the geographic coordinates in the shipment record as the origin coordinates and the destination coordinates. The lifecycle module 204 uses the geographic coordinates stored by the extraction module 206 for the proximity-based status transitions described above. In some examples, the extraction module 206 generates shaped geofences based on the origin and destination addresses by looking up property boundaries or building footprints associated with those addresses, and the lifecycle module 204 uses the shaped geofences in place of or in addition to the fixed-radius proximity threshold for determining status transitions.

The observation module 208 receives location observation data from one or more sources. The sources include fixed gateways such as the system gateway 104 deployed at known locations, vehicle-mounted gateways such as the vehicle gateway 102 deployed in vehicles, and the client device(s) 122 operating as a mobile observation source. Each location observation includes a MAC address of the observed tracking device 103, an RSSI value, a timestamp, and geographic coordinates of the observing source. The observation module 208 aggregates observations for each tracking device 103 over time to produce location estimates. A location estimate includes geographic coordinates representing an estimated position of the tracking device 103 and a timestamp. The observation module 208 provides the location estimates to the lifecycle module 204 for use in the proximity calculations and status transitions described above. The observation module 208 stores the location observations and location estimates in the database(s) 120 via the database server(s) 118.

Figure 3:
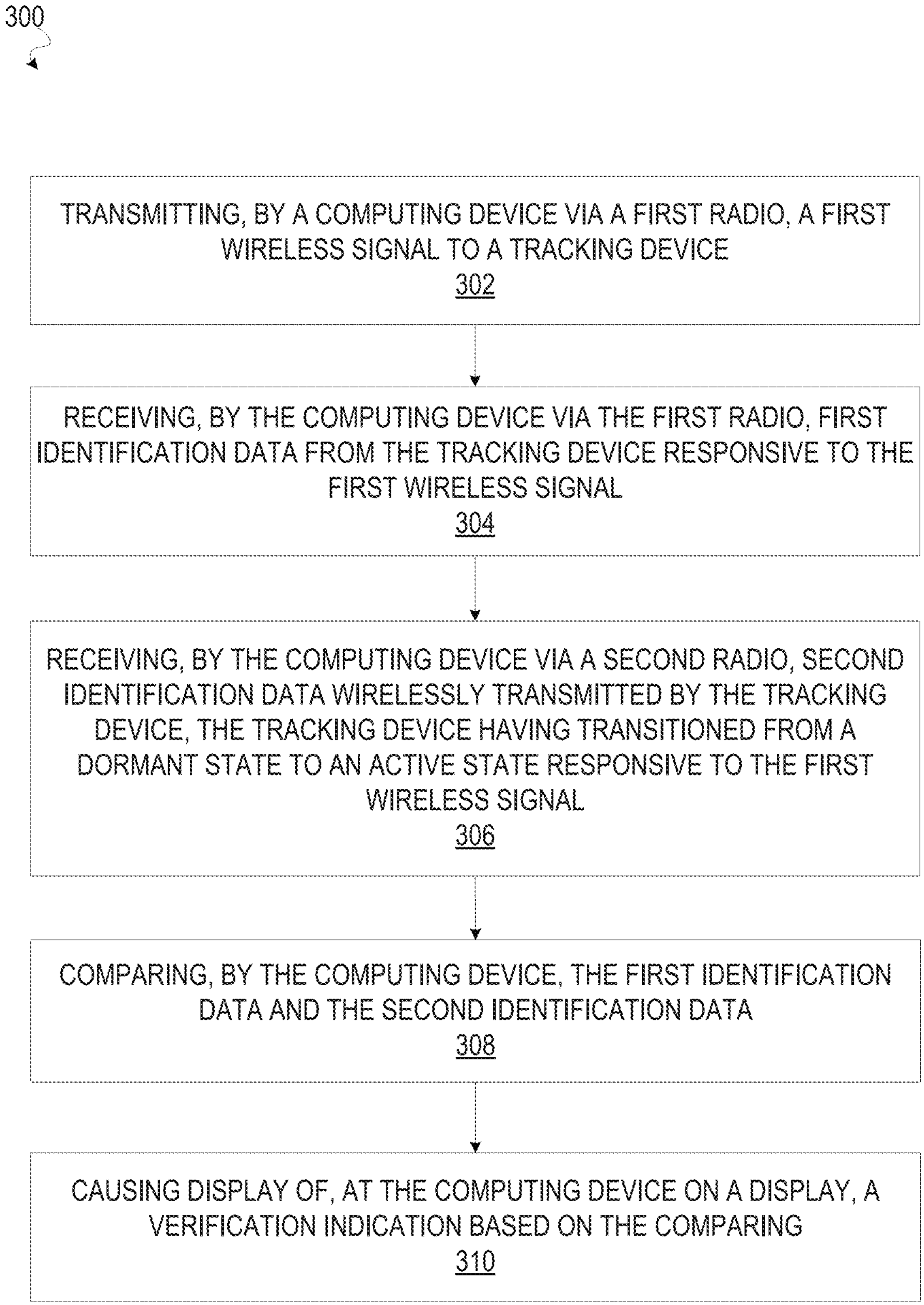
FIG. 3 is a flowchart depicting a method for activating and verifying a tracking device by transmitting a first wireless signal, receiving first and second identification data via respective radios, comparing the identification data, and causing display of a verification indication according to certain examples.

FIG. 3 is a flowchart illustrating a method 300 for activating and verifying a tracking device 103, according to certain examples. The method 300 may be performed by the client device(s) 122 executing the client application 114 described with respect to FIG. 1. The client device(s) 122 includes a first radio operating according to a near-field communication (NFC) protocol and a second radio operating according to a Bluetooth Low Energy (BLE) protocol.

At operation 302, the client device(s) 122 transmits, via the first radio, a first wireless signal to a tracking device 103. The tracking device 103 is a disposable tracking label containing an NFC chip and a BLE chip on a shared substrate. The NFC chip and the BLE chip are electrically and logically independent and do not communicate with each other. Prior to operation 302, the tracking device 103 is in a dormant state in which the BLE chip is unpowered. The first wireless signal is an NFC electromagnetic field emitted by the first radio of the client device(s) 122. The NFC chip of the tracking device 103 is passive and harvests energy from the first wireless signal. An energy harvesting circuit connected to the NFC chip triggers a power switch that supplies battery power to the BLE chip. The BLE chip transitions from the dormant state to an active state and begins emitting BLE advertisements. A user initiates operation 302 by holding the client device(s) 122 against the tracking device 103 at a distance within the operating range of the NFC protocol, which is approximately four centimeters.

At operation 304, the client device(s) 122 receives, via the first radio, first identification data from the tracking device 103 in response to the first wireless signal. The first identification data is read from an NDEF record stored on the NFC chip of the tracking device 103. The first identification data is formatted as a uniform resource identifier containing a plurality of parameters. The parameters include a BLE identifier comprising the last four bytes of the MAC address of the BLE chip, a serial number of the tracking device 103, a cryptographic signature over the serial number, a signature key version identifying which public key corresponds to the cryptographic signature, a hardware version, and a firmware version. The BLE identifier is programmed into the NFC chip during manufacturing and corresponds to the MAC address that the BLE chip will advertise when active. Operation 302 and operation 304 occur during the same physical action of holding the client device(s) 122 against the tracking device 103. The first wireless signal both powers on the BLE chip and enables the first radio to read the first identification data from the NFC chip.

At operation 306, the client device(s) 122 receives, via the second radio, second identification data wirelessly transmitted by the tracking device 103. The tracking device 103 has transitioned from the dormant state to the active state in response to the first wireless signal transmitted at operation 302. The second identification data is contained in a BLE advertisement emitted by the BLE chip of the tracking device 103. The client device(s) 122 switches the second radio to active scanning mode after completing operation 304. For each BLE advertisement received, the client device(s) 122 checks whether the advertisement contains a manufacturer identifier associated with the system 100, whether the advertisement follows a protocol format associated with the tracking device 103, and whether a product identifier field in the advertisement identifies the tracking device 103 as a tracking label. The second identification data includes a MAC address of the BLE chip, an RSSI value indicating received signal strength, a TX power value indicating calibrated transmission power, and a raw advertisement packet. The client device(s) 122 applies a timeout period to operation 306. In one example, the timeout period is twenty-five seconds. If no BLE advertisement matching the tracking device 103 is received within the timeout period, the client device(s) 122 determines that the activation has failed and causes display of a failure indication on the display.

At operation 308, the client device(s) 122 compares the first identification data received at operation 304 and the second identification data received at operation 306. The comparing includes matching the BLE identifier from the first identification data against the MAC address contained in the second identification data. In one example, the matching comprises comparing the last four bytes of the BLE identifier from the uniform resource identifier against the corresponding four bytes of the MAC address extracted from the raw advertisement packet. The comparing further includes measuring the RSSI value contained in the second identification data and determining whether the RSSI value exceeds a proximity threshold. Because the user held the client device(s) 122 against the tracking device 103 at operation 302 at a distance of approximately four centimeters, the RSSI value of the first BLE advertisement received from the tracking device 103 establishes a baseline signal strength for that tracking device 103 and client device(s) 122 combination. If the BLE identifier matches the MAC address and the RSSI value exceeds the proximity threshold, the client device(s) 122 determines that the activation is successful. If the BLE identifier does not match the MAC address, or if the RSSI value does not exceed the proximity threshold, the client device(s) 122 determines that the activation has failed.

Figure 5:
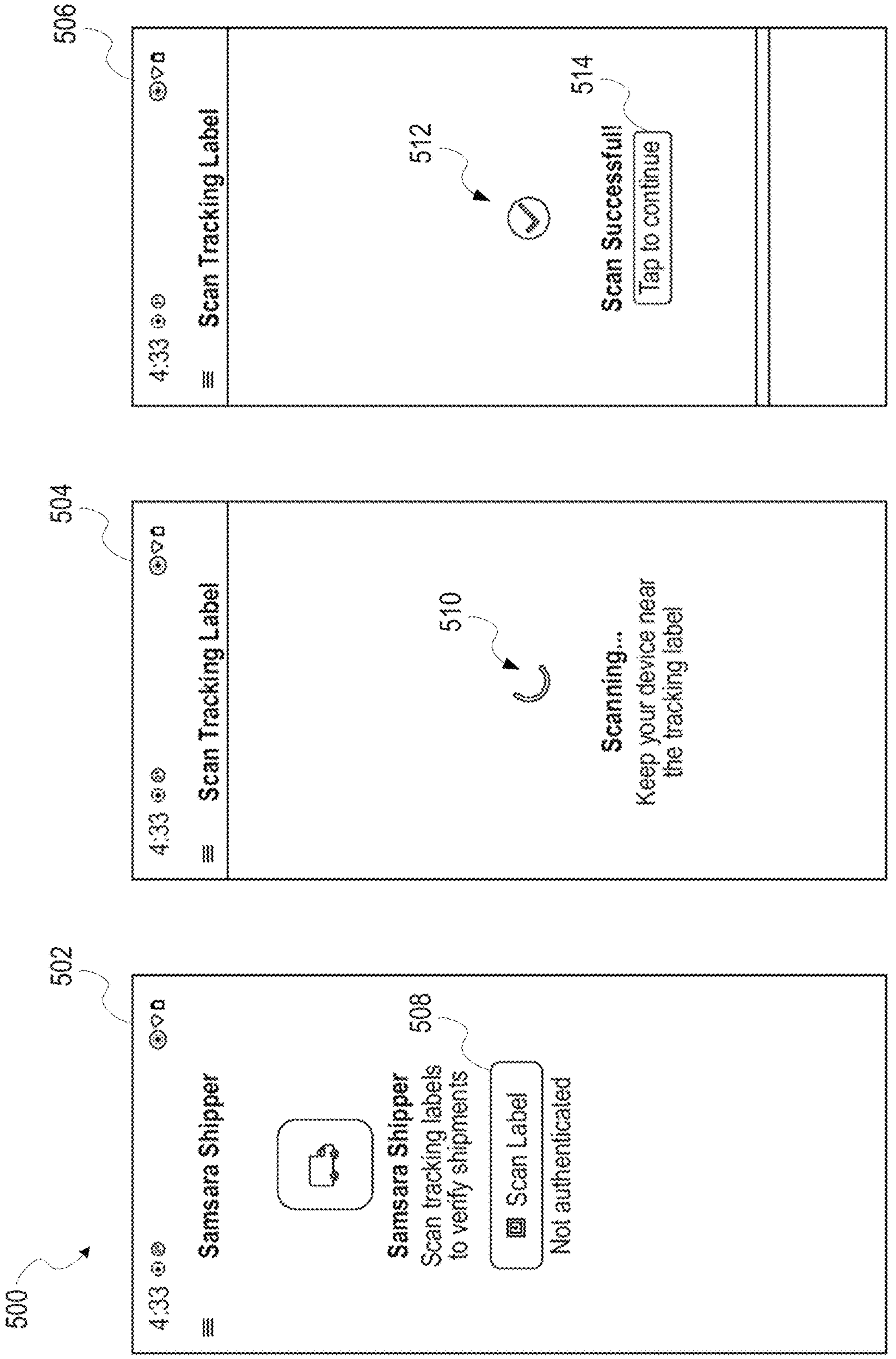
FIG. 5 is a series of user interface screens displayed on a computing device showing a tracking label scan initiation screen, a scanning-in-progress screen, and a scan-successful verification screen according to certain examples.
Figure 6:
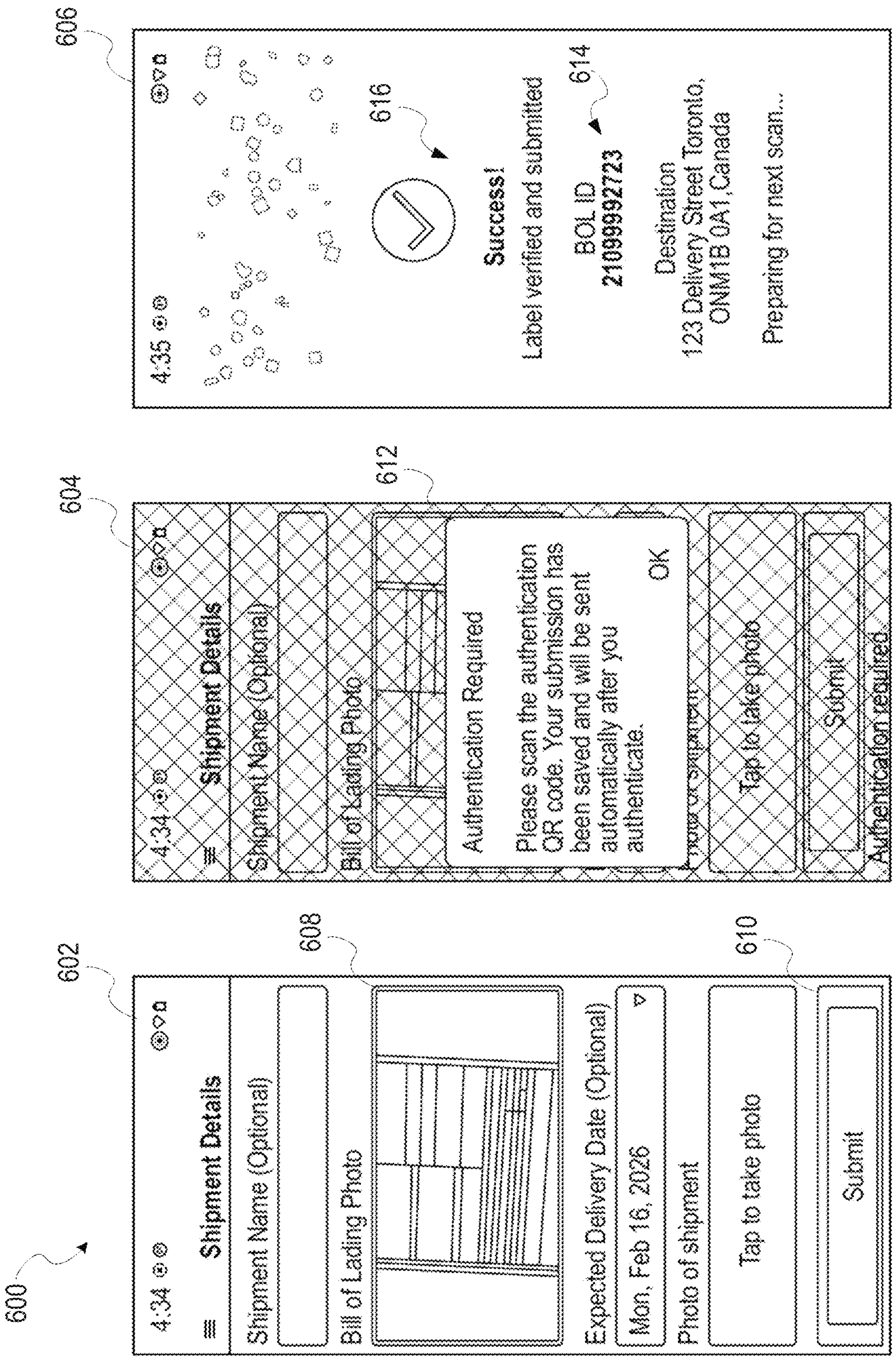
FIG. 6 is a series of user interface screens displayed on a computing device showing a shipment details entry screen with fields for shipment name, Bill of Lading photo, and expected delivery date, an authentication prompt screen, and a submission success screen displaying an extracted BOL identifier and destination address according to certain examples.

At operation 310, the client device(s) 122 causes display of, on a display of the client device(s) 122, a verification indication based on the comparing at operation 308. If the comparing at operation 308 determined that the activation is successful, the verification indication comprises a success indication. In one example, the success indication is a checkmark icon displayed on the display as shown in FIG. 5. If the comparing at operation 308 determined that the activation has failed, the verification indication comprises a failure indication. The failure indication may prompt the user to retry the activation by tapping the tracking device 103 again or to try a different tracking device 103. After displaying the success indication, the client application 114 may present a shipment details interface on the display, as shown in FIG. 6, enabling the user to capture an image of a shipping document, enter shipment metadata, or submit the activation data to the server system 108 as described with respect to FIG. 4.

Figure 4:
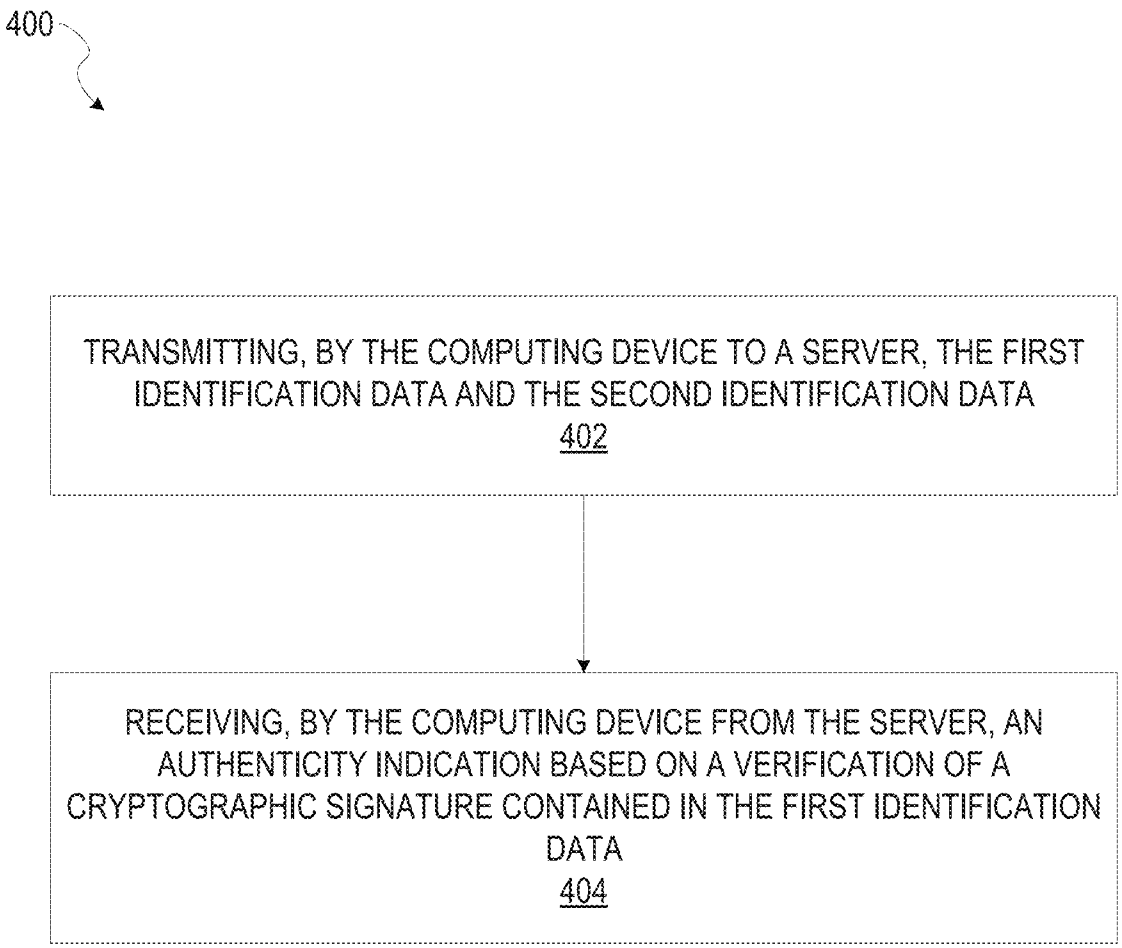
FIG. 4 is a flowchart depicting a method for transmitting identification data to a server and receiving an authenticity indication based on verification of a cryptographic signature contained in the first identification data according to certain examples.

FIG. 4 is a flowchart illustrating a method 400 for server-side authenticity verification of a tracking device 103, according to certain examples. The method 400 may be performed by the client device(s) 122 in communication with the server system 108 via the network 106. The method 400 is performed after the method 300 of FIG. 3, following a successful verification indication at operation 310.

At operation 402, the client device(s) 122 transmits, to the server system 108, the first identification data and the second identification data. The first identification data is the data received from the NFC chip of the tracking device 103 at operation 304 of the method 300. The second identification data is the data received from the BLE chip of the tracking device 103 at operation 306 of the method 300. The client device(s) 122 transmits the first identification data as the full uniform resource identifier read from the NFC chip, including the BLE identifier, the serial number, the cryptographic signature, the signature key version, the hardware version, and the firmware version. The client device(s) 122 transmits the second identification data as the raw BLE advertisement packet captured from the BLE chip, including the MAC address, the RSSI value, and the TX power value. The client device(s) 122 transmits the raw data rather than parsed or processed results, enabling the server system 108 to independently verify the data without relying on processing performed by the client device(s) 122. The client device(s) 122 also transmits GPS coordinates captured by a location sensor of the client device(s) 122 at the time of activation, a timestamp of the submission, and device metadata including a device model and an operating system version of the client device(s) 122.

In one example, the client device(s) 122 transmits the first identification data and the second identification data to the server system 108 without transmitting a user authentication credential. The first identification data and the second identification data serve as proof of physical custody of the tracking device 103 in lieu of a user authentication credential. The server system 108 accepts the submission based on the verification performed at operation 404 and attributes the submission to an organization by looking up the MAC address from the second identification data in a device registry stored in the database(s) 120. The device registry maps MAC addresses of tracking devices 103 to organizations.

In another example, the client device(s) 122 transmits a user authentication credential along with the first identification data and the second identification data. The user authentication credential is a bearer token previously obtained by the client device(s) 122 through a separate authentication flow. The server system 108 validates the bearer token and also performs the verification at operation 404. This allows backward compatibility with an existing credential-based authentication path while also performing the device-based verification.

At operation 404, the client device(s) 122 receives, from the server system 108, an authenticity indication based on a verification of a cryptographic signature contained in the first identification data. The server system 108 performs the verification using the verification module 202 described with respect to FIG. 2. The verification module 202 extracts the cryptographic signature and the signature key version from the first identification data. The verification module 202 selects a public key from a plurality of public keys stored in a versioned registry in the database(s) 120 based on the signature key version. The versioned registry allows migration to different cryptographic schemes without invalidating tracking devices 103 already in the field. The verification module 202 verifies the cryptographic signature against the serial number contained in the first identification data using the selected public key. The verification module 202 cross-checks the BLE identifier from the first identification data against the MAC address contained in the raw BLE advertisement packet of the second identification data, independently confirming the same match performed by the client device(s) 122 at operation 308 of the method 300. The verification module 202 evaluates the RSSI value from the second identification data against a proximity threshold. The verification module 202 evaluates the timestamps associated with the first identification data and the second identification data to confirm that the data is recent and not a replay of a previous activation.

If the cryptographic signature is valid, the BLE identifier matches the MAC address, the RSSI value exceeds the proximity threshold, and the timestamps are within an acceptable range, the server system 108 transmits a positive authenticity indication to the client device(s) 122. The server system 108 creates a shipment record in the database(s) 120 via the lifecycle module 204 described with respect to FIG. 2 and binds the shipment record to the tracking device 103. If any of the verification checks fail, the server system 108 transmits a negative authenticity indication to the client device(s) 122 and flags the tracking device 103 as potentially counterfeit, tampered, or malfunctioning. The client device(s) 122 causes display of the authenticity indication on the display. In one example, the positive authenticity indication is displayed as a confirmation screen showing a shipment identifier, a BOL identifier, and a destination address, as shown in the third panel of FIG. 6.

FIG. 5 illustrates a set of interface screens 500 displayed on the client device(s) 122 during the activation and verification of a tracking device 103, according to certain examples. The interface screens 500 correspond to operations of the method 300 described with respect to FIG. 3. The interface screens 500 are rendered by the client application 114 on a display of the client device(s) 122.

A first interface screen 502 is a home screen of the client application 114. The first interface screen 502 includes a scan control element 508. The scan control element 508 is a selectable button labeled "Scan Label." In response to user selection of the scan control element 508, the client application 114 activates the first radio of the client device(s) 122 and prompts the user to hold the client device(s) 122 against a tracking device 103. The first interface screen 502 also displays an authentication status. In the example shown, the authentication status indicates that the client device(s) 122 is not authenticated with the server system 108. As described with respect to FIG. 4, authentication with the server system 108 is not required to perform the activation and verification of the method 300.

A second interface screen 504 is displayed after the user holds the client device(s) 122 against the tracking device 103 and the first radio reads the first identification data from the NFC chip of the tracking device 103 at operation 304 of the method 300. The second interface screen 504 includes a scanning indicator 510. The scanning indicator 510 comprises an animated element and text instructing the user to keep the client device(s) 122 near the tracking device 103. The second interface screen 504 is displayed while the client device(s) 122 scans for BLE advertisements via the second radio at operation 306 of the method 300. The scanning indicator 510 remains displayed until the client device(s) 122 either receives a matching BLE advertisement or the timeout period expires.

A third interface screen 506 is displayed after the client device(s) 122 completes the comparing at operation 308 of the method 300. The third interface screen 506 includes a verification indication 512 and a continue control element 514. In the example shown, the comparing at operation 308 determined that the BLE identifier from the first identification data matches the MAC address from the second identification data and the RSSI value exceeds the proximity threshold. The verification indication 512 is a success indication comprising a checkmark icon and text indicating that the scan was successful. The continue control element 514 is a selectable button labeled "Tap to continue." In response to user selection of the continue control element 514, the client application 114 transitions to a shipment details interface as shown in FIG. 6. If the comparing at operation 308 had determined that the activation failed, the third interface screen 506 would instead display a failure indication prompting the user to retry the activation or try a different tracking device 103.

FIG. 6 illustrates a set of interface screens 600 displayed on the client device(s) 122 during shipment data entry and submission, according to certain examples. The interface screens 600 are rendered by the client application 114 on a display of the client device(s) 122. The interface screens 600 follow the verification of a tracking device 103 as described with respect to FIG. 5.

A first interface screen 602 is a shipment details form displayed after the user selects the continue control element 514 on the third interface screen 506 of FIG. 5. The first interface screen 602 includes a shipment name field, an image capture element 608, a delivery date field, and a submit control element 610. The image capture element 608 includes a region displaying a captured image of a shipping document and a selectable button labeled "Tap to take photo." In response to user selection of the image capture element 608, the client application 114 activates a camera of the client device(s) 122 and captures an image of a shipping document such as a Bill of Lading. In the example shown, the user has captured an image of a Bill of Lading, which is displayed within the image capture element 608. The submit control element 610 is a selectable button labeled "Submit." In response to user selection of the submit control element 610, the client application 114 transmits the captured image, the first identification data, the second identification data, and any user-entered fields to the server system 108 as described with respect to FIG. 4.

A second interface screen 604 is displayed in response to the server system 108 determining that a user authentication credential is required and was not provided with the submission. The second interface screen 604 includes the shipment details form of the first interface screen 602 with an authentication prompt 612 displayed as an overlay dialog. The authentication prompt 612 indicates that the submission has been saved locally on the client device(s) 122 and will be transmitted to the server system 108 after the user authenticates. In one example, the authentication prompt 612 instructs the user to scan a QR code containing a bearer token. In another example, as described with respect to FIG. 4, the server system 108 accepts the submission without a user authentication credential based on the first identification data and the second identification data serving as proof of physical custody of the tracking device 103. In that example, the second interface screen 604 is not displayed.

A third interface screen 606 is displayed after the server system 108 accepts the submission and returns a positive authenticity indication as described at operation 404 of the method 400. The third interface screen 606 includes a confirmation indication 616 and a shipment identifier display 614. The confirmation indication 616 comprises a checkmark icon and text indicating that the label has been verified and the submission accepted. The shipment identifier display 614 shows a BOL identifier and a destination address. In the example shown, the BOL identifier and the destination address were extracted by the server system 108 from the captured image of the Bill of Lading using the document extraction module 206 described with respect to FIG. 2. The server system 108 transmitted the extracted data to the client device(s) 122 as part of the positive authenticity indication. The third interface screen 606 also displays a status message indicating that the client application 114 is preparing for a next scan, enabling the user to activate and verify additional tracking devices 103 in sequence.

Figure 7:
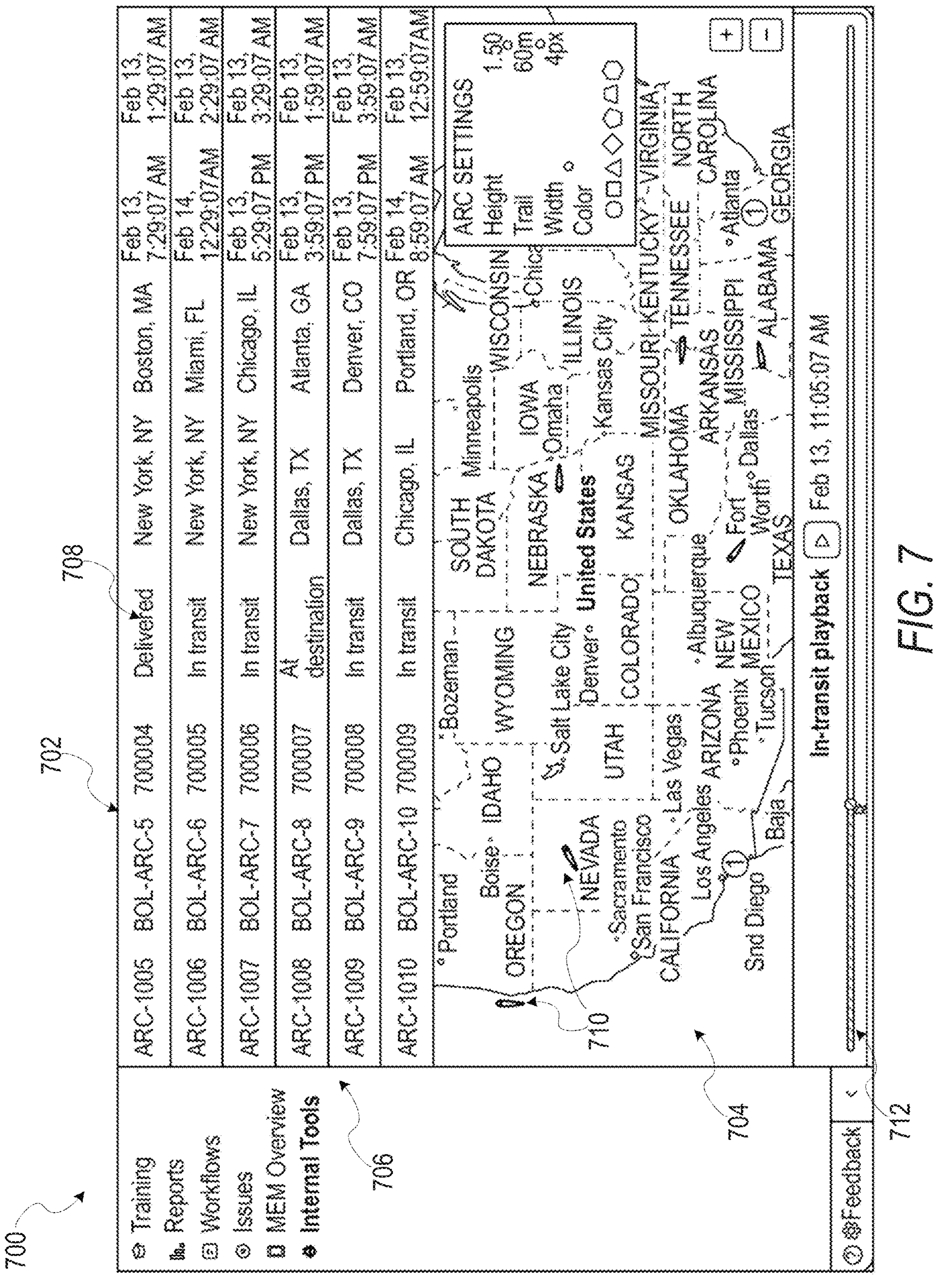
FIG. 7 is a dashboard view showing a shipment list with BOL identifiers, shipment statuses, origin and destination locations, and timestamps, together with a map displaying a shipment route with an in-transit playback control according to certain examples.

FIG. 7 illustrates an interface screen 700 displayed on the client device(s) 122 for monitoring shipments tracked by the system 100, according to certain examples. The interface screen 700 is rendered by the client application 114 or a web-based dashboard served by the server application 114 of the server system 108.

The interface screen 700 includes a shipment list 702 and a map display 704. The shipment list 702 includes a plurality of shipment entries 706. Each shipment entry 706 corresponds to a shipment record stored in the database(s) 120 and bound to a tracking device 103 as described with respect to FIG. 4. Each shipment entry 706 displays a shipment identifier, a BOL identifier, a device identifier, a status indicator 708, an origin, a destination, a departure timestamp, and an arrival timestamp. The status indicator 708 reflects the current state value of the shipment record as managed by the lifecycle module 204 described with respect to FIG. 2. In the example shown, the status indicators 708 include "Delivered," "In transit," and "At destination," corresponding to states in the shipment state machine.

The map display 704 includes a route visualization 710 showing the observed path of a selected tracking device 103. The route visualization 710 is generated from location observations collected by the vehicle gateway 102 and the system gateway 104 as the tracking device 103 emits BLE advertisements during transit. The location observations are processed by the data collection module 202 and the lifecycle module 204 to produce a sequence of coordinates associated with the shipment record. In the example shown, the route visualization 710 depicts a path from a southern origin to a northeastern destination across the United States.

The map display 704 includes a playback control 712 along a bottom edge. The playback control 712 includes a timestamp display and a selectable playback element. The playback control 712 enables a user to scrub through the location history of the selected shipment over time. As the user moves the playback control 712, the route visualization 710 updates to show the position of the tracking device 103 at the corresponding timestamp. The playback control 712 displays location observations only within the shipment lifecycle window. If the origin coordinates exist and the first location observation is within a threshold time period of the origin entry timestamp, the map display 704 suppresses location observations recorded before the origin entry timestamp. This prevents display of pre-shipment location data as described with respect to the privacy-preserving location history rule implemented by the lifecycle module 204.

Figure 8:
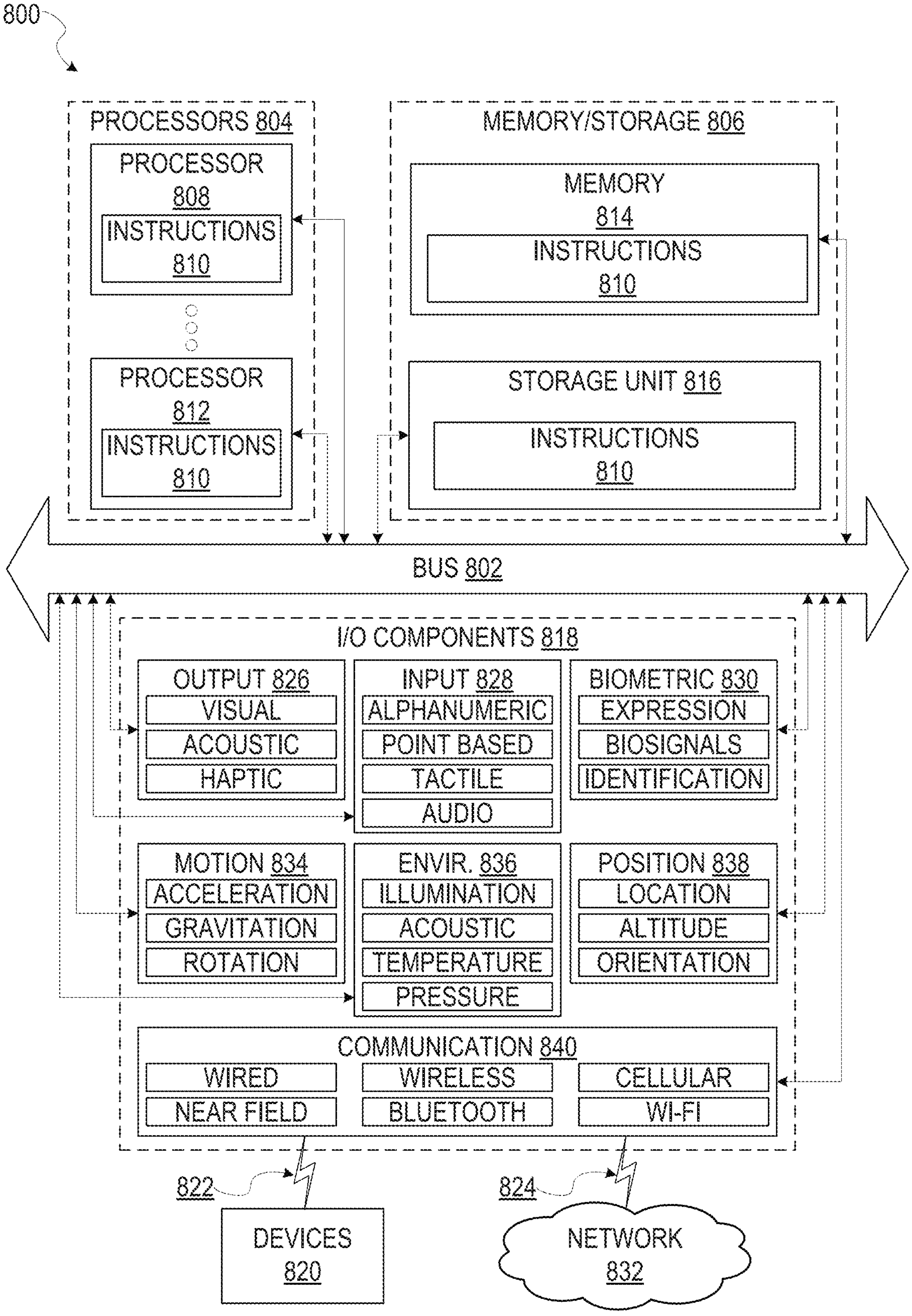
FIG. 8 is a block diagram of a computing device including processors, memory, storage, a bus, and input/output components including communication interfaces for near-field, Bluetooth, wireless, cellular, and wired protocols according to certain examples.

FIG. 8 is a block diagram illustrating components of a machine 800, according to some examples, able to read instructions from a machine-readable storage medium and perform the methodologies for tracking label activation and verification discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform tracking device activation and verification may be executed. The instructions 810 transform the general, non-programmed machine 800 into a particular machine 800 programmed to transmit a first wireless signal to a tracking device via a first radio, receive first identification data from the tracking device via the first radio, receive second identification data from the tracking device via a second radio after the tracking device transitions from a dormant state to an active state, compare the first identification data and the second identification data, and cause display of a verification indication based on the comparing. In a networked deployment, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 810, sequentially or otherwise, that specify actions to be taken by machine 800.

The machine 800 includes processors 804 that execute instructions for the tracking label activation and verification system, including the data collection module 202, analysis module 204, processing module 206, and alert generation module 208. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 include components configured to receive identification data from tracking devices, capture images of shipping documents, receive user input for shipment data entry, and display verification indications and shipment tracking information. The specific I/O components 818 that are included in a particular machine 800 will depend on the type of machine. For example, portable machines such as mobile phones will likely include a touch input device or other such input mechanisms, while a headless server machine will likely not include such a touch input device. The I/O components 818 are grouped according to functionality merely for simplifying the following discussion and the grouping is in no way limiting. In various examples, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 include touch input components, point-based input components, and camera components configured to capture images of shipping documents such as Bills of Lading for document extraction as described with respect to FIG. 6.

The I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include GPS receivers for capturing geographic coordinates of the client device(s) 122 at the time of tracking device activation, as described with respect to FIG. 4, and for determining proximity of a tracking device 103 to origin and destination coordinates of a shipment record as described with respect to FIG. 7.

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The NFC components correspond to the first radio described with respect to FIG. 3 and are used to transmit the first wireless signal to the tracking device 103 and receive the first identification data. The Bluetooth® Low Energy components correspond to the second radio described with respect to FIG. 3 and are used to receive the second identification data from the tracking device 103 after the tracking device 103 transitions from the dormant state to the active state. The devices 820 may be another machine or any of a wide variety of peripheral devices (e.g., a peripheral device coupled via a Universal Serial Bus (USB)). The communication components support transmission of identification data, cryptographic signature data, shipment data, captured images of shipping documents, and verification indications between the client device(s) 122 and the server system 108.

The communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). The NFC smart tag detection components read NDEF records from NFC chips of tracking devices 103, the NDEF records containing uniform resource identifiers with identification parameters as described with respect to FIG. 3. The optical reader components read QR codes containing bearer tokens for the credential-based authentication path described with respect to FIG. 4 and FIG. 6. In addition, a variety of information may be derived via the communication components 840, such as location via Internet Protocol (IP) geolocation, location via Wi-Fi® signal triangulation, location via detecting a NFC beacon signal that may indicate a particular location, and so forth. The communication components 840 enable the client device(s) 122 to perform the activation and verification method 300 of FIG. 3, the server-side authenticity verification method 400 of FIG. 4, and the shipment data submission described with respect to FIG. 6.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:

transmitting, by a computing device via a first radio, a first wireless signal to a tracking device;

receiving, by the computing device via the first radio, first identification data from the tracking device in response to the first wireless signal;

receiving, by the computing device via a second radio, second identification data wirelessly transmitted by the tracking device, the tracking device having transitioned from a dormant state to an active state in response to the first wireless signal;

comparing, by the computing device, the first identification data and the second identification data; and causing display of, at the computing device on a display, a verification indication based on the comparing.

2. The method of claim 1, wherein the first identification data comprises an identifier of the tracking device, and wherein the comparing comprises matching the identifier against an address contained in the second identification data.

3. The method of claim 1, further comprising:

measuring, by the computing device, a signal strength of the second identification data, wherein the verification indication is further based on the signal strength exceeding a threshold.

4. The method of claim 1, wherein the first radio operates according to a near-field communication protocol and the second radio operates according to a Bluetooth protocol.

5. The method of claim 1, further comprising:

transmitting, by the computing device to a server, the first identification data and the second identification data; and receiving, by the computing device from the server, an authenticity indication based on a verification of a cryptographic signature contained in the first identification data.

6. The method of claim 5, wherein the server verifies the cryptographic signature using a public key selected from a plurality of public keys based on a key version identifier contained in the first identification data.

7. The method of claim 1, wherein the first identification data is received as a uniform resource identifier containing a plurality of parameters, the plurality of parameters comprising an identifier of the tracking device, a serial number, and a cryptographic signature.

8. A system comprising:

a first radio;

a second radio;

a display;

one or more processors; and a non-transitory computer-readable medium storing instructions that, when executed by the one or more processors, cause the system to perform operations comprising:

transmitting, via the first radio, a first wireless signal to a tracking device;

receiving, via the first radio, first identification data from the tracking device in response to the first wireless signal;

receiving, via the second radio, second identification data wirelessly transmitted by the tracking device, the tracking device having transitioned from a dormant state to an active state in response to the first wireless signal;

comparing the first identification data and the second identification data; and causing display of, on the display, a verification indication based on the comparison.

9. The system of claim 8, wherein the first identification data comprises an identifier of the tracking device, and wherein the instructions to compare comprise instructions to match the identifier against an address contained in the second identification data.

10. The system of claim 8, wherein the operations further comprise:

measuring a signal strength of the second identification data, wherein the verification indication is further based on the signal strength exceeding a threshold.

11. The system of claim 8, wherein the first radio operates according to a near-field communication protocol and the second radio operates according to a Bluetooth protocol.

12. The system of claim 8, wherein the operations further comprise:

transmitting, to a server, the first identification data and the second identification data; and receiving, from the server, an authenticity indication based on a verification of a cryptographic signature contained in the first identification data.

13. The system of claim 12, wherein the server verifies the cryptographic signature using a public key selected from a plurality of public keys based on a key version identifier contained in the first identification data.

14. The system of claim 8, wherein the first identification data is received as a uniform resource identifier containing a plurality of parameters, the plurality of parameters comprising an identifier of the tracking device, a serial number, and a cryptographic signature.

15. The system of claim 8, wherein the verification indication comprises a success indication in response to the first identification data matching the second identification data, and a failure indication in response to the first identification data not matching the second identification data within a timeout period.

16. A non-transitory computer-readable medium storing instructions that, when executed by one or more processors of a computing device, cause the computing device to perform operations comprising:

transmitting, via a first radio, a first wireless signal to a tracking device;

receiving, via the first radio, first identification data from the tracking device in response to the first wireless signal;

receiving, via a second radio, second identification data wirelessly transmitted by the tracking device, the tracking device having transitioned from a dormant state to an active state in response to the first wireless signal;

comparing the first identification data and the second identification data; and causing display of, on a display, a verification indication based on the comparison.

17. The non-transitory computer-readable medium of claim 16, wherein the first identification data comprises an identifier of the tracking device, and wherein the instructions to compare comprise instructions to match the identifier against an address contained in the second identification data.

18. The non-transitory computer-readable medium of claim 16, wherein the operations further comprise:

measuring a signal strength of the second identification data, wherein the verification indication is further based on the signal strength exceeding a threshold.

19. The non-transitory computer-readable medium of claim 16, wherein the operations further comprise:

transmitting, to a server, the first identification data and the second identification data; and receive, from the server, an authenticity indication based on a verification of a cryptographic signature contained in the first identification data.

20. The non-transitory computer-readable medium of claim 16, wherein the operations further comprise:

in response to the verification indication indicating a successful match, transmitting to a server shipment data associated with the tracking device without transmitting a user authentication credential.

* * * * *